April 29, 1930.  F. W. BOMMER  1,756,172
THREAD CUTTING MACHINE
Filed June 5, 1928
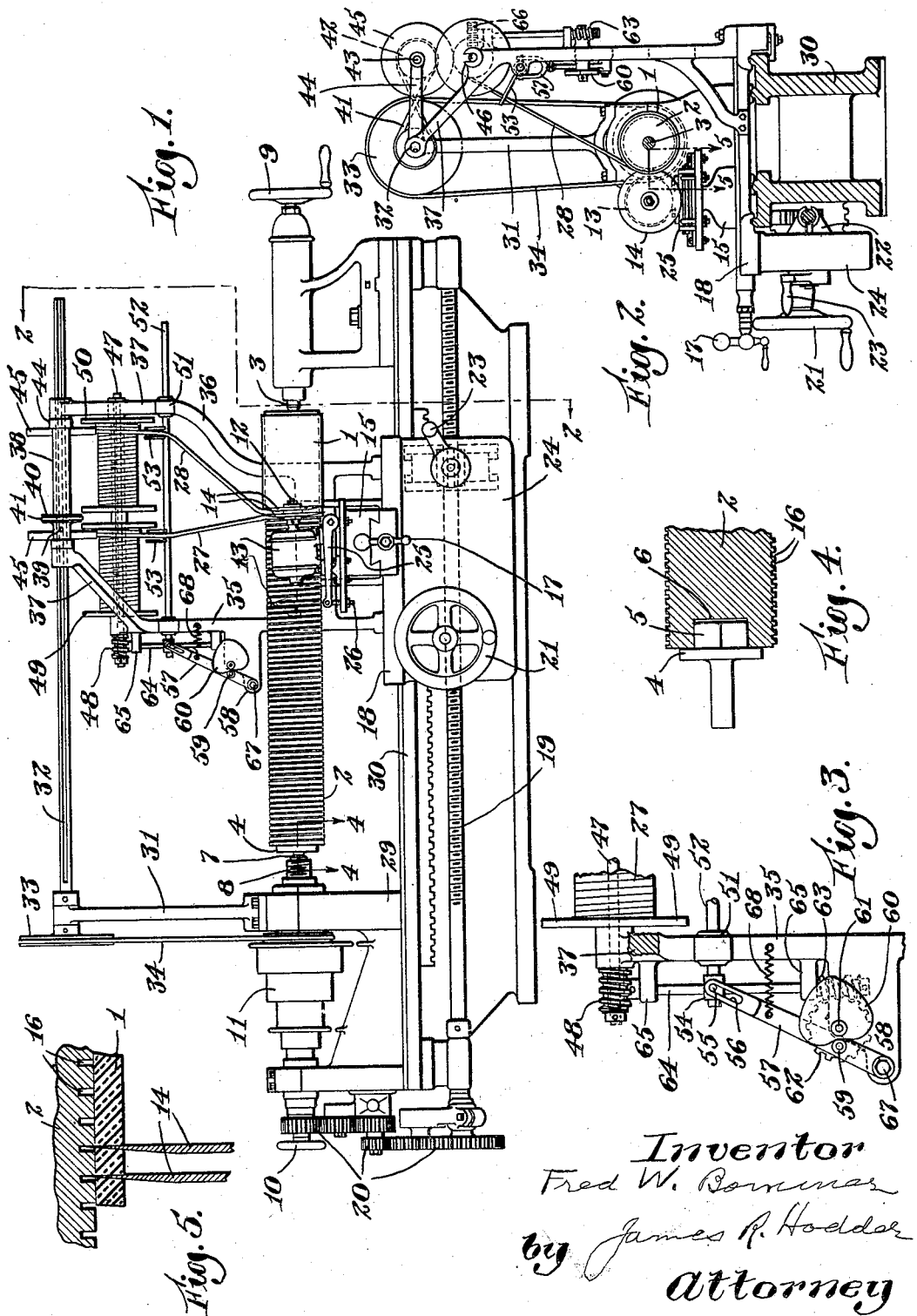
Inventor
Fred W. Bommer
by James R. Hodder
Attorney Patented Apr. 29, 1930

1,756,172

UNITED STATES PATENT OFFICE

FRED W. BOMMER, OF EVERETT, MASSACHUSETTS

THREAD-CUTTING MACHINE

Application filed June 5, 1928. Serial No. 283,045.

My present invention relates to thread cutting machines, and more particularly to machines for cutting rubber into strips or threads.

An important object of the present invention is the provision of a machine which will be economical to manufacture and to operate, which will be simple and efficient, and which will manufacture or produce rubber threads in a rapid manner.

Another object of the present invention is the provision of a machine, so constructed and arranged as to cut the above mentioned threads from tubular stock.

A further object of the invention resides in my novel cutting mandrel, over which the tubular stock is drawn, said mandrel being provided with a plurality of helical grooves. This mandrel, in the machine of the present application, is adapted to be rotated, but is immovable longitudinally.

Another object of the present invention is the provision of means to enable the cutting of a plurality of threads simultaneously, said means comprising a plurality of rotatable cutting knives, preferably circular, which knives are adapted to penetrate completely through the stock being cut and into the grooves in said mandrel, thus insuring guiding of the knives and further insuring the producing of rubber threads of uniform width. The knives are adjustable relatively to the mandrel, to compensate for wear, and also are adapted to move longitudinally of the mandrel during the cutting operation.

A further feature of the invention consists in my novel means for winding the rubber threads, after they are formed, on suitable spools. This means comprises friction rollers, adapted to roll directly upon the rubber threads as they are wound on their respective spools, said friction rollers being automatically adjustable as the spools are filled, these friction rollers insuring proper winding of the thread on the spools.

Another feature of the invention resides in the construction of novel means to insure uniform and level winding of the rubber threads on their respective spools. This last named means comprises a pair of guides for each thread, said guides being mounted on a shaft, which is cam and spring operated, by the spools in their rotation, to move said pairs of guides back and forth longitudinally of the spools and in unison, thus insuring level winding of the rubber threads on their spools, which is an important feature, as the threads being thus wound, will subsequently feed more smoothly and evenly from the spools. As one use of the rubber threads manufactured by my novel machine is in the manufacture of golf balls, where the rubber threads are wound upon the ball at a high rate of speed, it is essential that these threads be so wound upon the spools that they will not jam, pull or break during the subsequent unwinding operations.

The above and other features of the invention, details of construction, combinations of parts, and advantages, will be hereinafter more fully described and claimed.

Referring to the drawings, illustrating a preferred embodiment of the present invention, Fig. 1 is a side elevation of a machine embodying the novel features of my invention, Fig. 2 is a vertical sectional view on the line 2—2 of Fig. 1;

Fig. 3 is an enlarged detail, partly in section, illustrating the mechanism for operating the level winding guides to wind the threads in a level manner on their spools;

Fig. 4 is a cross-sectional view on the line 4—4 of Fig. 1; and

Fig. 5 is a cross-sectional view on the line 5—5 of Fig. 2.

Referring now to the drawings, for a particular description of the invention, 1 designates the rubber stock, which is in tubular form and drawn onto a mandrel 2. This mandrel is mounted between a tail stock 3 and a center 4, said center having a squared end 5 adapted to seat in a squared recess 6 in the mandrel 2, said center also being gripped in the spindle 7 in the chuck 8. The tail stock 3 is adjusted by means of a hand wheel 9, and the spindle 7 is adjusted by means of a hand wheel 10. The spindle 7 and center 4 are driven through cone pulleys 11 from a suitable source of power (not shown), thus rotating the mandrel 2 and the tubular stock 1 carried thereby. The mandrel 2, while rotatable, is fixed against movement longitudinally. Mounted on the shaft 12 of a motor 13 are a pair of circular cutting knives 14, adapted to be rotated by the motor 13. The motor is mounted on a cross slide 15, adjustable by a handle 17, so that the knives are adjustable to and from the mandrel 2. When in proper adjusted position, said knives 14 will penetrate entirely through the stock 1 and will enter helical grooves 16 in the periphery of the mandrel 2. The knives will thus be spaced, by said grooves, a predetermined distance from each other, thus cutting threads of predetermined width.

If a narrower or wider thread is desired, a mandrel with differently spaced grooves will be substituted for the mandrel 2. The cross-slide 15 is mounted in a saddle 18 movable longitudinally by the lead screw 19 connected through the gears 20 to the pulleys 11. An apron hand wheel 21 is provided if it is desired to move the saddle 18 manually. The saddle 18 is operatively connected to the lead screw 19, when power driven, through a nut cam 22 operated by a handle 23, said handle being outside of the apron 24. The angle of the knives 14 and motor 13 may be varied by the lever 25 and bolt 26.

It will thus be seen that when power is transmitted to the pulleys 11, the mandrel 2 will be rotated and the knives 14 will be moved along the mandrel, to the right as viewed in Fig. 1, said knives being in turn rotated by the motor 13 and following the grooves 16, and cutting from the tubular stock 1 the rubber threads 27 and 28 respectively.

Referring to Fig. 5, it will be seen that each rotary cutter presents on its advancing side a substantially flat face providing a shearing edge or wall, and that the helical groove is so formed as to present to the shearing edge of the cutter also a shearing edge or wall with which the cutter is maintained in contact as the cutter is progressively fed along the mandrel. Preferably the groove is of such depth that the edge or periphery of the rotary knife remains out of contact with the bottom thereof and of such width that the contact between the knife and the mandrel occurs along the two cooperating shearing edges only. Accordingly, when the cutting action takes place, the knife starts in contact with the shearing edge only of the helical groove and continues in contact therewith, producing a clean shearing cut and removing a continuous length of thread without friction between the knife and the mandrel other than that arising from the frictional contact of one shearing edge with the other.

I have devised novel mechanism to wind the rubber threads 27 and 28, and this mechanism will now be described. Mounted on a support 29 on the bed 30 is a standard 31 carrying in a suitable bearing at its upper end a splined shaft 32. This shaft carries, at one end, a pulley 33 driven, by means of a belt 34, from the cone pulleys 11. Mounted on the saddle 18 are a pair of standards 35 and 36, each of these standards having an inwardly and upwardly inclined arm 37 with suitable bearings for the shaft 32. Mounted on the shaft 32, between the bearings on the arms 37 is a sleeve 38 splined to the shaft 32 by a key 39, said sleeve carrying a pulley 40 on which is a belt 41 connected to a pulley 42 on a shaft 43 carried in the outer ends of rocker arms 44 mounted on the shaft 32. Mounted also on this shaft 43 are a pair of friction rollers 45.

The upper ends of the standards 35 and 36 are yoked, as at 46, and in these yokes rests a shaft 47 carrying at one end a worm 48. Splined to the shaft 47 are a pair of spools 49 and 50, on which the threads 27 and 28 are respectively to be wound. The friction rollers 45 are adapted to rest on the threads 27 and 28 and when said rollers 45 are rotated, by the belt 41, said rollers will in turn impart rotation to the spools 49 and 50, winding the threads 27 and 28 thereon, as they are cut from the stock 1 by the knives 14. The friction rollers 45 being mounted on the rocker arms 44 will, of course, be elevated as the spools 49 and 50 fill with thread, and when the spools are filled to their desired capacity, the shaft 47 may be raised from the yokes 46 and the spools 49 and 50 removed longitudinally thereof, the rollers 45 being first raised, on rocker arms 44, clear of the spools 49 and 50.

In order to insure level winding of the strips 27 and 28 on their respective spools, I provide, in the bearings 51 on the standards 35 and 36, a shaft 52, carrying pairs of guide rods 53, 53, between which the threads 27 and 28 pass on their way to their respective spools. On one end of the shaft 52 is a collar 54 with a pin 55 thereon, said pin entering a slot in the yoked end of the lever 57. This lever 57, is pivoted at its lower end to a boss 58 on the standard 35, and has thereon a roller 59 adapted to be engaged by a cam 60 mounted on a pin 61, said pin having, on the opposite end to the cam 60, a pinion 62 adapted to be engaged by a worm 63 on a vertical shaft 64 having bearings in lugs 65 on the standard 35. The upper end of this shaft 64 carries a pinion 66 adapted to be engaged and rotated by the worm 48 on the shaft 47. The worm 48 is, of course, rotated by the action of the friction rollers 45 on the rubber threads being wound on the spools 49 and 50.

Rotation thus being imparted to the cam 60, the lever 57 will be oscillated, on its pivot 67, moving the shaft 52 longitudinally of the spools 49 and 50 in predetermined timed relation with the winding of the threads 27 and 28 thereon, thus insuring that the threads 27 and 28 will be wound in a level manner on their respective spools. Movement of the shaft 52 to the left, Figs. 1 and 2, is caused by the cam 60, movement to the right being caused by the tension of a coiled spring 68, the cam moving the lever 57 to the left against the tension of said coiled spring 68.

The operation of my present novel machine is simple, and will be readily understood, being described briefly as follows:

Power being transmitted to the pulleys 11, the mandrel 2 will be rotated, together with the rubber tubular stock 1 thereon. Simultaneously the saddle 18 will be moved longitudinally of the mandrel 2, carrying the motor 13 and knives 14 therewith. The knives will cut from the stock 1 the threads 27 and 28, which will be led and secured to the spools 49 and 50 for winding thereon. As the threads are being cut, the friction rollers 45 will be rotated through the belts 34 and 41, as above explained, winding the threads on the spools and simultaneously causing operation of the guides 53 through the medium of the oscillating lever 57. On completion of the winding operation, or when the spools 49 and 50 are filled to their desired capacity, the spools 49 and 50 may be removed from the yoked ends of the standards in the manner above described, and a pair of new or empty spools replaced, whereupon the machine will be ready for continued operation, fresh mandrels with the tubular rubber stock thereon being replaced, of course, when the stock being operated on is exhausted.

The simplicity, efficiency, and speed of operation of my present novel machine will instantly appeal to those skilled in this art.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. In a machine for cutting a thread or strip from a tubular body of rubber or like elastic material, the combination with a rotary cutter having a shearing edge, of a mandrel on which said tubular body may be mounted, said mandrel having on its surface a helical groove and presenting to the cutter a shearing edge or wall, means to rotate the mandrel, means to rotate the cutter, and means to move the cutter with its shearing edge in contact with the shearing edge of said helical groove to effect a shearing cut on said tubular body and remove therefrom a continuous thread or strip.

2. In a machine for cutting a thread or strip from a tubular body of rubber or like elastic material, the combination with a plurality of rotary cutters arranged in parallel, each having a shearing edge, of a mandrel on which said tubular body may be mounted, said mandrel having on its surface a pair of parallel helical grooves presenting to said cutters respectively each a shearing edge or wall, means to rotate the mandrel, means to rotate the cutters, and means to move the cutters each with its shearing edge in contact with the shearing edge of the registering helical groove to effect a shearing cut on said tubular body and remove a plurality of continuous threads or strips therefrom.

In testimony whereof, I have signed my name to this specification.

FRED W. BOMMER.